US012784941B2

(12) United States Patent
Nagatomo et al.

(10) Patent No.: US 12,784,941 B2
(45) Date of Patent: Nov. 3, 2026

(54) ELECTRONIC COMPONENT

(71) Applicant: Murata Manufacturing Co., Ltd., Nagaokakyo (JP)

(72) Inventors: Masakiyo Nagatomo, Nagaokakyo (JP); Yoshinobu Saki, Nagaokakyo (JP); Keisuke Isogai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 477 days.

(21) Appl. No.: 18/420,936

(22) Filed: Jan. 24, 2024

(65) Prior Publication Data

US 2024/0161949 A1 May 16, 2024

Related U.S. Application Data

(63) Continuation of application No. PCT/JP2022/028463, filed on Jul. 22, 2022.

(30) Foreign Application Priority Data

Aug. 31, 2021 (JP) ................................ 2021-141837

(51) Int. Cl.
*H01C 1/148* (2006.01)
*H01C 1/14* (2006.01)
(Continued)

(52) U.S. Cl.
CPC ........... *H01C 1/148* (2013.01); *H01C 1/1406* (2013.01); *H01C 1/1413* (2013.01); *H01G 4/248* (2013.01);
(Continued)

(58) Field of Classification Search
CPC .... H01C 1/148; H01C 1/1406; H01C 1/1413; H01C 7/025; H01C 7/045; H01C 7/115; H01G 4/248; H01G 4/1209
See application file for complete search history.

(56) References Cited

U.S. PATENT DOCUMENTS 5,367,285 A * 11/1994 Swinehart .............. H01C 7/006 338/308
7,580,241 B2 * 8/2009 Sakashita ............. H01G 4/1209 361/321.1
8,077,445 B2 * 12/2011 Iwanaga ................ H01C 1/142 361/308.1

FOREIGN PATENT DOCUMENTS

JP H11162771 A 6/1999
JP 2004119798 A 4/2004
(Continued)

OTHER PUBLICATIONS

International Search Report in PCT/JP2022/028463, mailed Oct. 18, 2022, 3 pages.
(Continued)

*Primary Examiner* — Kyung S Lee
(74) *Attorney, Agent, or Firm* — Keating & Bennett, LLP

(57) ABSTRACT

In an electronic component including a ceramic body and an external electrode, the external electrode includes a resin layer including a conductive powder and a plating film in direct contact with the resin layer. The plating film includes a metal with a face-centered cubic structure, and a value of F is about 0.20 or more and about 0.50 or less, where $F=(P-P_0)/(1-P_0)$, $P_0=I_0(111)/\{I_0(111)+I_0(200)+I_0(220)\}$ and $P=I(111)/\{I(111)+I(200)+I(220)\}$, and $I_0$ (111), $I_0$ (200), and $I_0$ (220) are diffraction intensities of a (111) plane, a (200) plane, and a (220) plane obtained from known powder X-ray diffraction data for a metal in the plating film, and I (111), I (200), and I (220) are diffraction intensities of a (111) plane, a (200) plane, and a (220) plane obtained from an X-ray diffraction pattern of the plating film.

20 Claims, 2 Drawing Sheets

(51) Int. Cl.

| | |
|---|---|
| ***H01C 7/02*** | (2006.01) |
| ***H01C 7/04*** | (2006.01) |
| ***H01C 7/115*** | (2006.01) |
| ***H01G 4/12*** | (2006.01) |
| ***H01G 4/248*** | (2006.01) |

(52) U.S. Cl.
CPC ............. *H01C 7/025* (2013.01); *H01C 7/045* (2013.01); *H01C 7/115* (2013.01); *H01G 4/1209* (2013.01)

(56) References Cited

FOREIGN PATENT DOCUMENTS

| | | | |
|---|---|---|---|
| JP | 2013110363 | A | 6/2013 |
| JP | 2017197788 | A | 11/2017 |

OTHER PUBLICATIONS

Written Opinion in PCT/JP2022/028463, mailed Oct. 18, 2022, 3 pages.

* cited by examiner

ELECTRONIC COMPONENT

CROSS REFERENCE TO RELATED APPLICATIONS

This application claims the benefit of priority to Japanese Patent Application No. 2021-141837 filed on Aug. 31, 2021 and is a Continuation application of PCT Application No. PCT/JP2022/028463 filed on Jul. 22, 2022. The entire contents of each application are hereby incorporated herein by reference.

BACKGROUND OF THE INVENTION

1. Field of the Invention

The present invention relates to an electronic component.

2. Description of the Related Art

An electronic component such as a positive characteristic thermistor generally includes an external electrode formed by stacking a conductive layer provided at an end portion of a ceramic body and a metal plating film formed by electrolytic plating, electroless plating, or the like. The plating film can be formed of one layer or multiple layers. In an example of a two-layer plating film, a first plating film in contact with the conductive layer is a nickel plating film for the purpose of improving heat resistance and the like, and a second plating film covering the first plating film is a tin plating film for the purpose of improving solderability.

In the electronic component after mounting, a crack may occur in the ceramic body due to impact, thermal stress, or the like. In order to prevent this, Japanese Patent Application Laid-Open No. H11-162771 proposes providing a conductive epoxy-based thermosetting resin layer including a metal powder (hereinafter, sometimes referred to as a "resin layer") between a baked electrode and a plating layer in an external electrode of an electronic component. The resin layer functions as a stress absorbing layer, and can suppress the occurrence of a crack in the ceramic body.

SUMMARY OF THE INVENTION

In an external electrode including a resin layer as in Japanese Patent Application Laid-Open No. H11-162771, a plating film formed on the resin layer may be peeled off. When the plating film is peeled off, contact failure may occur inside the external electrode, and the electronic component may not operate normally.

In Japanese Patent Application Laid-Open No. H11-162771, peeling of the plating layer formed on the resin layer is not examined.

Example embodiments of the present invention reduce or prevent peeling of a plating film in an electronic component including an external electrode including the plating film on a resin layer.

According to an example embodiment of the present invention, an electronic component includes a ceramic body and an external electrode at an end of the ceramic body, wherein the external electrode includes a resin layer including a conductive powder and a plating film in direct contact with the resin layer, the plating film includes a metal with a face-centered cubic structure, and F of the plating film is about 0.20 or more and about 0.50 or less, where $F=(P-P_0)/(1-P_0)$, $P_0=I_0(111)/\{I_0(111)+I_0(200)+I_0(220)\}$, $P=I(111)/\{I(111)+I(200)+I(22°\}$, and $I_0$ (111), $I_0$ (200), and $I_0$ (220) are diffraction intensities of a (111) plane, a (200) plane, and a (220) plane obtained from known powder X-ray diffraction data for a metal of the plating film, respectively, and in the formula (3), I (111), I (200), and I (220) are diffraction intensities of a (111) plane, a (200) plane, and a (220) plane obtained from an X-ray diffraction pattern of the plating film, respectively.

According to example embodiments of the present invention, peeling of a plating film on a resin layer can be reduced or prevented.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

The present inventors have extensively conducted studies for reducing or preventing peeling of a plating film in an electronic component including an external electrode including a resin layer and the plating film in direct contact with the resin layer. The present inventors have discovered that peeling of the plating film can be reduced or prevented by improving orientation of the metal material of the plating film, which led to the conception and development of example embodiments of the present invention.

In a rotary barrel method, which is a common plating method in the manufacture of electronic components, a plating film is formed while leveling (flattening) the surface of the plating film by an impact force due to rotation. At this time, the plating film grows disorderly due to planarization, and a plating film having unaligned crystal orientations (that is, crystallographic consistency does not match) is formed. The disordered growth of the plating film may cause defects of metal bonding in the plating film. In the case of such a plating film, since adhesion at an interface between the resin layer and the plating film is low and strength of the plating film itself is low, it is considered that the plating film is easily peeled off at the interface between the resin layer and the plating film or due to internal destruction of the plating film itself.

Thus, the present inventors have considered that the crystallographic consistency of the plating film and the crystallographic consistency between the plating film and the conductive powder in the resin layer contribute to reduction or prevention of peeling of the plating film, and have conducted further studies and development on this basis. As a result, the present inventors optimized the plating bath and the plating conditions to grow the plating film such that the plating film is strongly oriented to a specific surface ((111) plane), thus forming a plating film having a regular crystal structure. With such a plating film, it is considered that the adhesion between the resin layer and the plating film is improved, the strength of the plating film itself is also improved, and peeling of the plating film can be reduced or prevented.

Hereinafter, electronic components according to example embodiments of the present invention will be described with reference to the drawings.

Example Embodiment 1

Figure 1:
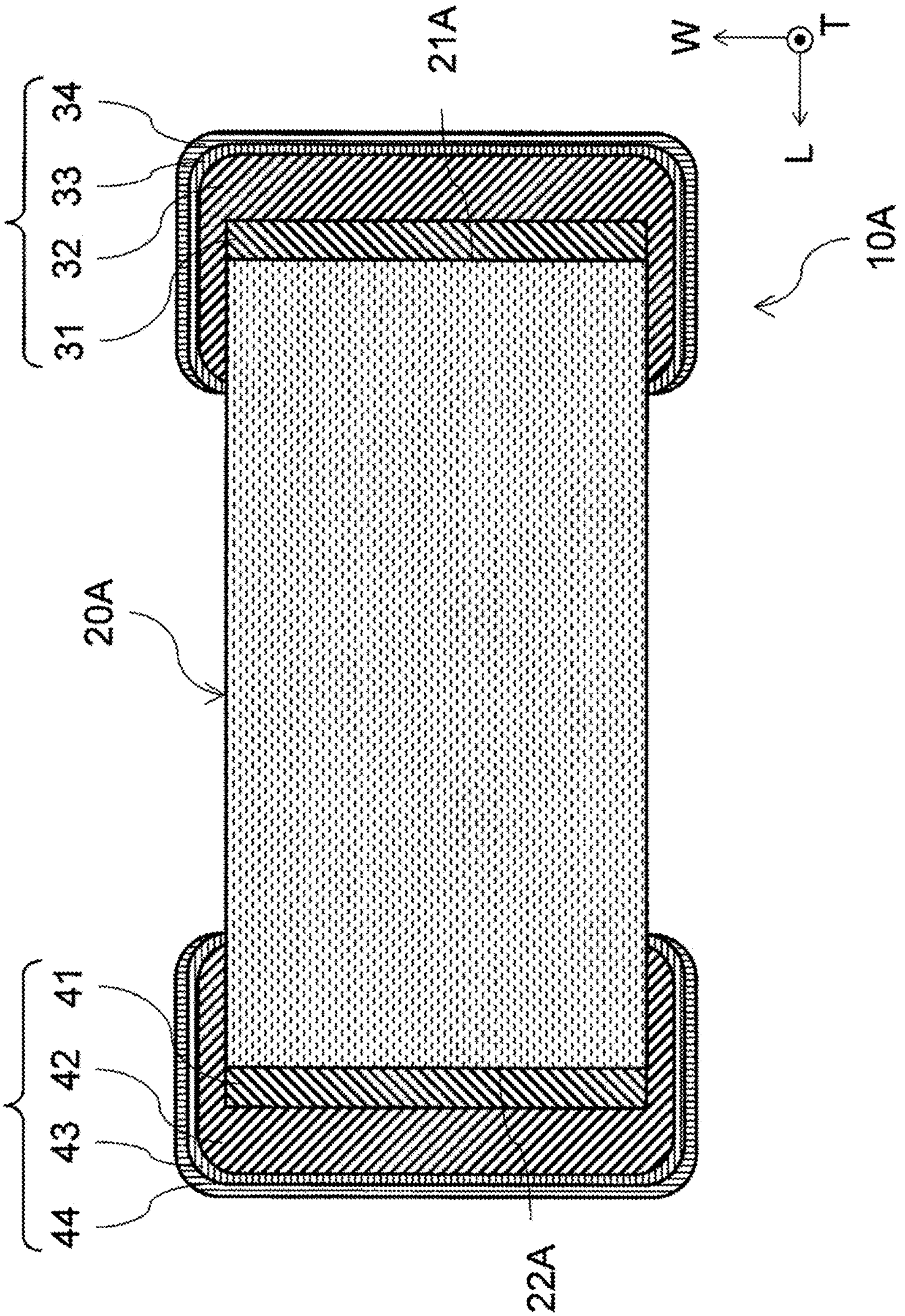
FIG. 1 is a schematic sectional view illustrating an electronic component according to Example Embodiment 1 of the present invention.

FIG. 1 is a schematic sectional view of an electronic component 10A according to Example Embodiment 1 of the present invention. An example of the electronic component 10A illustrated in FIG. 1 is a positive characteristic (or positive temperature coefficient, PTC) thermistor.

The electronic component 10A includes a ceramic body 20A and an external electrode provided at an end of the ceramic body 20A.

The electronic component 10A includes at least one external electrode. The positive characteristic thermistor illustrated in FIG. 1 includes a pair of external electrodes 30 and 40 provided at both ends of the ceramic body 20A.

The external electrodes 30 and 40 include at least resin layers 32 and 42 including conductive powder, and plating films 33 and 43 in direct contact with the resin layers 32 and 42. The external electrodes 30 and 40 may further include base layers 31 and 41 provided between the end surfaces 21A and 22A of the ceramic body 20A and the resin layers 32 and 42, and second plating films 34 and 44 covering the plating films 33 and 43.

As a result of intensive studies, the present inventors have discovered that, in order to reduce or prevent peeling of the plating films 33 and 43 formed on the resin layers 32 and 42, it is effective to form the plating films 33 and 43 from a metal with a face-centered cubic structure, and to preferentially orient the (111) plane as the orientation of the crystal structure of the plating films 33 and 43. For the orientation of the (111) plane of the plating films 33 and 43, a value of F defined by the following formula (1) is an index. It is considered that when the value of F obtained for the plating films 33 and 43 is about 0.20 or more and about 0.50 or less, adhesion between the resin layers 32 and 42 and the plating films 33 and 43 increases, and internal destruction of the plating films 33 and 43 hardly occurs, so that peeling of the plating films 33 and 43 can be reduced or prevented.

$$F=(P-P_0)/(1-P_0) \quad (1)$$

In the formula (1), $P_0$ and P are obtained by the following formulas (2) and (3).

$$P_0=I_0(111)/\{I_0(111)+I_0(200)+I_0(220)\} \quad (2)$$

$$P=I(111)/\{I(111)+I(200)+I(220)\} \quad (3)$$

In the formula (2), $I_0$ (111), $I_0$ (200), and $I_0$ (220) are diffraction intensities of a (111) plane, a (200) plane, and a (220) plane obtained from known powder X-ray diffraction data for a metal of the plating film, respectively, and in the formula (3), I (111), I (200), and I (220) are diffraction intensities of a (111) plane, a (200) plane, and a (220) plane obtained from an X-ray diffraction pattern of the plating film, respectively.

Known X-ray powder diffraction data for $I_0$ (111), $I_0$ (200), and $I_0$ (220) are available from the ICDD database.

I (111), I (200), and I (220) are obtained from diffraction patterns obtained by measuring the plating films 33 and 43 with an XRD diffractometer. A two-dimensional X-ray diffraction image obtained using a two-dimensional detector is converted into a one-dimensional profile, and a value of diffraction intensity of a peak of each orientation plane is obtained using the obtained one-dimensional profile. The value of the diffraction intensity is obtained as a relative intensity with the highest intensity as 100.

As the XRD diffractometer, a micro X-ray diffractometer can be used, and as a specific device, for example, there is D8 DISCOVER manufactured by BRUKER axs.

In order to perform XRD diffraction measurement on the plating films 33 and 43 of the electronic component 10A, when the plating films 33 and 43 are covered with the second plating films 34 and 44, the second plating films 34 and 44 are removed to expose the plating films 33 and 43, and then XRD diffraction of the plating films 33 and 43 is measured. As the removal of the second plating films 34 and 44, for example, there is a method of dissolving and removing the second plating films 34 and 44 with a solvent that selectively dissolves only the second plating films 34 and 44.

The value of F obtained by the formulas (1) to (3) is an index of the orientation of the (111) plane of the material of the plating films 33 and 43. Hereinafter, the formulas (1) to (3) will be described in detail.

As a definition of an "orientation degree" of a predetermined orientation plane, a Lotgering factor f is known. The Lotgering factor f is calculated by the following formula (4) using the intensity of X-rays diffracted from a predetermined orientation plane (referred to as (xyz) for convenience).

$$f=(p-p_0)/(1-p_0) \quad (4)$$

In the formula (4), $p_0$ is a value based on known powder X-ray diffraction data for a target substance, and p is a value based on an X-ray diffraction pattern of the target substance, and $p_0$ and p are obtained by the following formulas (5) and (6), respectively.

$$p_0=I_0(xyz)/\Sigma I_0(hkl) \quad (5)$$

$$p=I(xyz)/\Sigma I(hkl) \quad (6)$$

In the formulas (5) and (6), h, k, and l are integers including 0.

In the formula (5), $\Sigma I_0$ (hkl) means the sum of diffraction intensities (usually, relative intensity with the highest intensity as 100) of peaks of all planes obtained from known powder X-ray diffraction data for the target substance, and $I_0$ (xyz) means a value of diffraction intensity (same as above) of a peak of a predetermined orientation plane (xyz) obtained from known powder X-ray diffraction data for the target substance.

In the XRD diffraction pattern of the substance having the face-centered cubic structure, the diffraction intensity of peaks belonging to three planes including the (111) plane, the (200) plane, and the (220) plane is remarkable. Thus, the present inventors have simplified the definition of Lotgering factor f that requires the diffraction intensities of the peaks of all the planes, and have determined a factor F similar to Lotgering factor from only the diffraction intensities of the peaks of the (111) plane, the (200) plane, and the (220) plane. That is, the above formulas (1) to (3) for obtaining the factor F have been determined by modifying the formulas (4) to (6) for obtaining Lotgering factor f. The present inventors discovered that the value of F of the plating films 33 and 43 obtained from the formulas (1) to (3) is significant as an index for knowing the adhesion between the resin layers 32 and 42 and the plating films 33 and 43.

The value of F can be a value of −1 or more and 1 or less, and the closer to 1, the higher the orientation of the (111) plane of the plating films 33 and 43, and as described above, in example embodiments of the present invention, the value of F of the plating films 33 and 43 is about 0.20 or more and about 0.50 or less. When the value of F is less than about 0.20, the adhesion between the resin layers 32 and 42 and the plating films 33 and 43 is not sufficient. When the value of F exceeds about 0.50, although the adhesion between the resin layers 32 and 42 and the plating films 33 and 43 increases, the plating films 33 and 43 having high orientation need to be formed, and severe restrictions are imposed on the production conditions in order to realize such a plating film, so that the production cost increases.

The value of F is preferably about 0.23 or more and about 0.48 or less, and more preferably about 0.25 or more and about 0.45 or less, for example.

The metal with the face-centered cubic structure and of the plating films 33 and 43 is preferably at least one selected from the group consisting of Ni, Au, Cu, Ag, Pt, Pd, and Al.

The thicknesses of the plating films 33 and 43 may be any film thickness as long as the end surfaces 21A and 22A of the ceramic body 20A of the electronic component 10A can be protected from the reflow atmosphere, and for example, in the case of a Ni plating film, the thickness is preferably about 2 μm or more and about 10 μm or less.

When the external electrodes 30 and 40 further include the second plating films 34 and 44 covering the plating films 33 and 43, the second plating films 34 and 44 are preferably at least one selected from the group consisting of Sn, Au, Cu, and Pd.

The thicknesses of the second plating films 34 and 44 may be any film thicknesses as long as the solder material wets and spreads during reflow, and for example, in the case of a Sn plating film, the average film thickness is preferably about 0.5 μm or more and about 5.0 μm or less.

The thicknesses of the plating films 33 and 43 and the second plating films 34 and 44 are measured by performing fluorescent X-ray analysis on a sample in which each plating film is exposed to the outermost surface, and applying the obtained X-ray intensity to a calibration curve. The calibration curve is obtained by performing fluorescent X-ray analysis on a standard sample having a known film thickness, and drawing a relationship between the obtained X-ray intensity and the film thickness by a regression equation. The thickness of the plating film in the standard sample having a known film thickness is measured by the following method. A plurality of standard samples in which the plating film thickness is changed by intentionally changing the plating conditions are provided, polished in section, an electron microscope image or a scanning ion microscope image of the section is acquired, and the film thickness of the plating film of the standard sample is measured.

The resin layers 32 and 42 of the external electrodes 30 and 40 function as stress absorbing layers that reduce or prevent the occurrence of cracks in the ceramic body 20A due to external impact, thermal stress, or the like. The resin layers 32 and 42 include a conductive powder and a resin material. The resin layers 32 and 42 have the conductivity due to the conductive powder dispersed in the resin material.

The conductive powder included in the resin layers 32 and 42 is preferably a metal powder. In particular, at least one metal powder selected from the group consisting of Ag, Au, Ni, Cu, Pt, Pd, and Al is preferable. Since these metals are metals with the face-centered cubic structure like the metals of the plating films 33 and 43, the metal powders exposed on the surfaces of the resin layers 32 and 42 and the plating films 33 and 43 formed on the surfaces of the resin layers 32 and 42 have good crystallographic consistency. Thus, it is expected that orientation growth of the plating films 33 and 43 is promoted. In addition, an effect of improving the adhesion between the plating films 33 and 43 and the resin layers 32 and 42 is also expected.

As the resin material included in the resin layers 32 and 42, a thermosetting resin, an ultraviolet curable resin, and the like are preferable, and in particular, a thermosetting resin having excellent heat resistance is preferable. As the thermosetting resin, for example, an epoxy resin, a phenol resin, a urethane resin, a silicone resin, a polyimide resin and the like are suitable, and in particular, the epoxy resin is preferable because it is excellent in heat resistance, moisture resistance, adhesion, and the like. The resin materials may be used singly or in combination of two or more kinds thereof. A curing agent may be included together with the thermosetting resin. When an epoxy resin is used as the base resin, known compounds such as phenol type, amine type, acid anhydride type, and imidazole type compounds can be used as curing agents.

Example embodiments of the present invention are particularly effective in the small chip-type electronic component 10A. This is because, in the small chip-type electronic component 10A, a contact area between the resin layers 32 and 42 and the plating films 33 and 43 is small, and therefore the adhesion between them is particularly important. For example, example embodiments of the present invention are suitable for an electronic component 10A having a length of about 0.6 mm or more and about 1.0 mm or less and a width of about 0.3 mm or more and about 0.5 mm or less (corresponding to 0603 size to 1005 size).

Examples of the electronic component 10A suitable for applying Example Embodiment 1 include chip-type ceramic electronic components such as a negative characteristic (or negative temperature coefficient, NTC) thermistor, a varistor, and a capacitor, in addition to the above-described positive characteristic thermistor. In these electronic components, the material of the ceramic body 20A is selected depending on the required characteristics.

Hereinafter, a non-limiting example of a method for manufacturing the electronic component 10A according to Example Embodiment 1 will be described by taking a positive characteristic thermistor having a structure illustrated in FIG. 1 as an example.

Preparation of Ceramic Body 20A

The ceramic body 20A is formed of, for example, $BaTiO_3$, $CaTiO_3$, $SrTiO_3$, $CaZrO_3$, $(BaSr)TiO_3$, $Ba(ZrTi)O_3$, and $(BiZn)Nb_2O_7$.

In the preparation of the ceramic body 20A illustrated in FIG. 1, first, as a raw material of the ceramic body 20A, a predetermined amount of a ceramic raw material such as $BaCO_3$, $TiO_2$, PbO, $SrCO_3$, or $CaCO_3$, a semiconducting agent such as $Sm_2O_3$ or $Er_2O_3$, a sintering aid such as $SiO_2$, a characteristic modifier of $MnO_2$, and the like are weighed. Each weighed raw material is charged into a ball mill together with a grinding medium such as Partially Stabilized Zirconia (PSZ) (hereinafter, also referred to as PSZ ball) and pure water, and wet-mixed and ground. The obtained mixture is calcined at a predetermined temperature (e.g., about 1000° C. to about 1200° C.) to provide a calcined powder.

An organic binder, a dispersant, and pure water are added to the obtained calcined powder, mixed, and then dried to be granulated. A molded body is obtained by molding the obtained granulated product. The molded body is subjected to a degreasing treatment and a debinding treatment, and fired at a predetermined temperature (about 1200° C. to about 1400° C.) and in a predetermined atmosphere to obtain the ceramic body 20A.

Formation of Base Layer 31 and 41

As illustrated in FIG. 1, after the production of the ceramic body 20A, the base layers 31 and 41 covering end surfaces 21A and 22A of the ceramic body 20A may be formed.

For the base layers 31 and 41, a material having an ohmic property with the ceramic body 20A is appropriately selected. For example, the base layer is formed of a metal material such as Ag, Zn, Cr, Ni, Cu, Ti, W, V, Au, or Al, and an oxide.

The base layers 31 and 41 are formed by various thin film forming methods (sputtering method, vapor deposition method, etc.), various printing methods, a dip method, or other methods. When the base layer is formed by various printing methods or dip methods, the base layers 31 and 41 are obtained by baking a conductive paste. The baking temperature of the conductive paste is, for example, about 500° C. to about 900° C.

Formation of Resin Layers 32 and 42

The resin layers 32 and 42 including conductive powder are formed at the end of the ceramic body 20A.

The resin layers 32 and 42 are provided by curing a resin electrode paste having fluidity. The resin electrode paste includes the conductive powder and a resin raw material. The resin electrode paste is applied to the end of the ceramic body 20 so as to cover the base layers 31 and 41, and then the resin raw material in the resin electrode paste is cured.

As the conductive powder included in the resin electrode paste, the same conductive powder as the conductive powder included in the resin layers 32 and 42 of the electronic component 10A is used. That is, the conductive powder included in the resin electrode paste is preferably a metal powder, and in particular, at least one metal powder selected from the group consisting of Ag, Au, Ni, Cu, Pt, Pd, and Al is preferable.

As the resin raw material included in the resin electrode paste, a material that can form the resin material included in the resin layers 32 and 42 of the electronic component 10A is used. That is, as the resin raw material included in the resin electrode paste, a resin raw material such as a thermosetting resin before curing or an ultraviolet curable resin before curing is preferable, and in particular, a resin raw material of a thermosetting resin having excellent heat resistance is preferable. As a resin raw material of the thermosetting resin, for example, a resin raw material such as an epoxy resin, a phenol resin, a urethane resin, a silicone resin, or a polyimide resin is suitable, and a resin raw material of an epoxy-based resin is particularly preferable. The resin raw material is preferably a liquid resin raw material. The resin raw materials may be used singly or in combination of two or more kinds thereof. It is preferable to use a curing agent together with the resin raw material of the thermosetting resin. When an epoxy resin is used as the base resin, known compounds such as phenol type, amine type, acid anhydride type, and imidazole type compounds can be used as curing agents.

A blending amount of the conductive powder is preferably about 70 parts by weight or more and about 90 parts by weight or less with respect to about 10 parts by weight or more and about 30 parts by weight or less of the resin material.

Formation of Plating Films 33 and 43

The plating films (first plating films) 33 and 43 in direct contact with the resin layers 32 and 42 are formed.

The plating films 33 and 43 are formed of a metal with the face-centered cubic structure. As described above, the metal with the face-centered cubic structure is preferably at least one selected from the group consisting of Ni, Au, Cu, Ag, Pt, Pd, and Al.

The plating films 33 and 43 can be formed by a known plating method such as a method using centrifugal force or an electrolytic barrel plating method.

A known plating bath can be used. When the metal with the face-centered cubic structure is Ni, there are, for example, a non-glossy nickel bath, a Watt bath, a sulfamic acid bath, a Woodstrike bath, a total chloride bath, and the like.

By properly controlling the plating conditions of the plating films 33 and 43, it is possible to form the plating films 33 and 43 in which the value of F serving as an index of orientation is about 0.20 or more and about 0.50 or less, for example.

Formation of Second Plating Films 34 and 44

The second plating films 34 and 44 covering the plating films 33 and 43 may be formed.

As described above, the second plating films 34 and 44 are preferably at least one selected from the group consisting of Sn, Au, Cu, and Pd.

The second plating films 34 and 44 are formed by a known plating method such as a method using centrifugal force or an electrolytic barrel plating method. A known plating bath can be used, and examples thereof include an acidic bath and an alkaline bath in the case of a Sn plating film. As the acidic bath, a sulfuric acid bath, a methanesulfonic acid bath, or the like can be used.

As described above, the method for manufacturing the electronic component 10A according to Example Embodiment 1 of the present invention has been described by taking the positive characteristic thermistor as an example. However, other electronic components can also be appropriately manufactured based on the description of the present specification.

Example Embodiment 2

An electronic component according to Example Embodiment 2 is different from Example Embodiment 1 in that an internal electrode is provided inside the ceramic body, and the other configurations are the same as those of Example Embodiment 1. The electronic component according to Example Embodiment 2 will be described focusing on differences from Example Embodiment 1.

Figure 2:
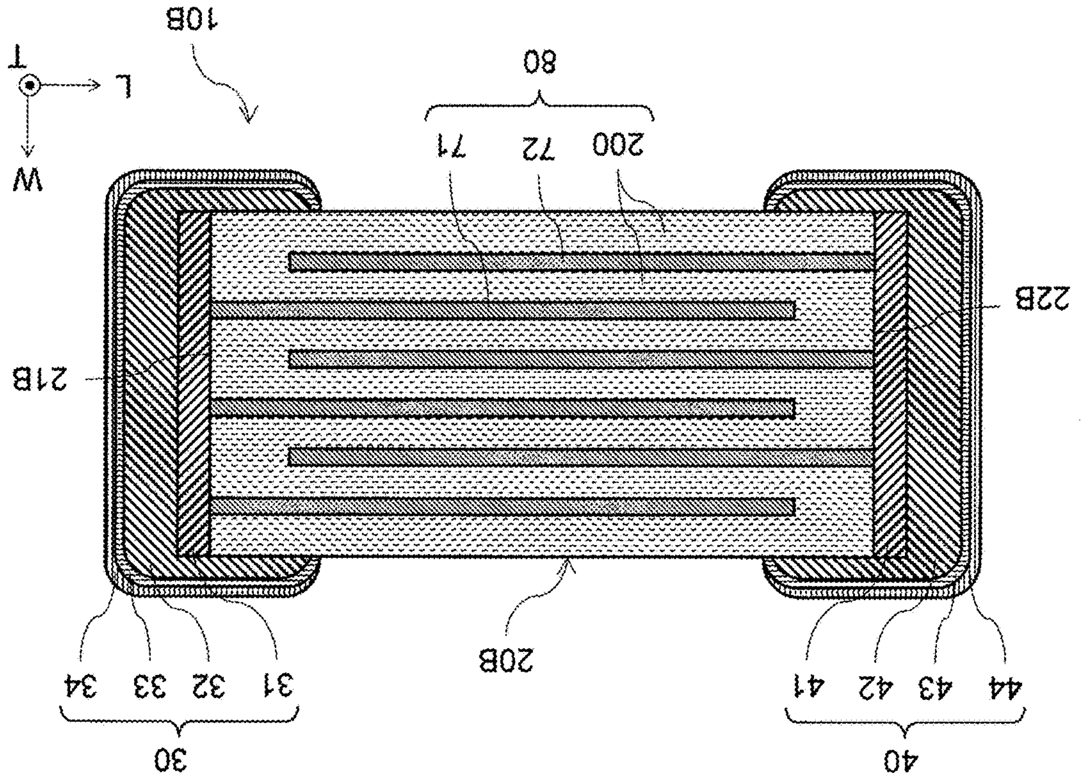
FIG. 2 is a schematic sectional view illustrating an electronic component according to Example Embodiment 2 of the present invention.

FIG. 2 is a schematic sectional view of an electronic component 10B according to Example Embodiment 2 of the present invention. An example of the electronic component 10B illustrated in FIG. 2 is a positive characteristic thermistor including internal electrodes 71 and 72.

The electronic component 10B includes a ceramic body 20B and an external electrode provided at an end of the ceramic body 20B. In Example Embodiment 2, the electronic component 10B further includes internal electrodes 71 and 72 inside the ceramic body 20B.

Since the configuration of the external electrode is similar to that of Example Embodiment 1, the description thereof is omitted.

The ceramic body 20B includes a plurality of ceramic layers 200. The plurality of ceramic layers 200 and the internal electrodes 71 and 72 are alternately stacked to form a laminated body 80. The internal electrode 71 is exposed from one end surface 21B of the ceramic body 20B, and the internal electrode 72 is exposed from the other end surface 22B of the ceramic body 20B. Base layers 31 and 41 of external electrodes 30 and 40 formed at the ends of the ceramic body 20B are in contact with the internal electrodes 71 and 72 exposed from the end surfaces 21B and 22B of the ceramic body 20B.

The electronic component 10B suitable for applying Example Embodiment 2 is a chip-type ceramic electronic component such as a negative characteristic (or negative temperature coefficient, NTC) thermistor, a varistor, and a capacitor, in addition to the above-described positive characteristic thermistor, and a capacitor, and includes an internal electrode.

A non-limiting example of a method for manufacturing the electronic component 10B according to Example Embodiment 2 will be described by taking a positive characteristic thermistor having the internal electrodes 71 and 72 as illustrated in FIG. 2 as an example.

Preparation of Ceramic Body 20B

In the preparation of the ceramic body 20B, first, a calcined powder as a raw material is prepared in the same procedure as in the ceramic body 20A of Example Embodiment 1, and then the laminated body 80 is prepared using the calcined powder.

The ceramic body 20B is formed of, for example, $BaTiO_3$, $CaTiO_3$, $SrTiO_3$, $CaZrO_3$, $(BaSr)TiO_3$, $Ba(ZrTi)O_3$, and $(BiZn)Nb_2O_7$.

The material forming the internal electrodes 71 and 72 is not particularly limited as long as it is conductive, and examples thereof include Ag, Cu, Pt, Ni, Al, Pd, and Au, and particularly, Ag, Cu, and Ni are preferable.

First, as a raw material of the ceramic body 20B, a predetermined amount of a ceramic raw material such as $BaCO_3$, $TiO_2$, PbO, $SrCO_3$, or $CaCO_3$, a semiconducting agent such as $Sm_2O_3$ or $Er_2O_3$, a sintering aid such as $SiO_2$, a characteristic modifier of $MnO_2$, and the like are weighed. Each weighed raw material is charged into a ball mill together with a grinding medium such as Partially Stabilized Zirconia (PSZ) (hereinafter, also referred to as PSZ ball) and pure water, and wet-mixed and ground. The obtained mixture is calcined at a predetermined temperature (e.g., about 1000° C. to about 1200° C.) to provide a calcined powder.

An organic binder is added to the obtained calcined powder, and the resulting mixture is subjected to a wet mixing treatment to form a slurry, and then subjected to molding processing using a doctor blade method or the like to prepare a ceramic green sheet having a desired thickness. Next, a conductive paste for the internal electrodes is applied to the surface of the ceramic green sheet to form an internal electrode pattern. The conductive paste for the internal electrode can be prepared, for example, by dispersing metal powder and the organic binder in an organic solvent. The paste for the internal electrode may be applied by, for example, screen printing or the like. A predetermined number of the ceramic green sheets on which the internal electrode patterns are thus formed are laminated, and then the ceramic green sheets on which the internal electrode patterns are not formed are sandwiched between upper and lower sides and subjected to pressure bonding to prepare a laminated body. This laminated body is cut into a predetermined size, then subjected to a degreasing treatment and a debinding treatment, and then fired at a predetermined temperature (about 1200° C. to about 1400° C.) in a predetermined atmosphere to obtain a laminated body 80 having a laminated structure including the ceramic body 20B (a plurality of ceramic layers 200) and internal electrodes 71 and 72.

Formation of Base Layer 31 and 41

As illustrated in FIG. 2, after the production of the ceramic body 20B, the base layers 31 and 41 covering end surfaces 21B and 22B (end surfaces of the laminated body 80) of the ceramic body 20B may be formed. The base layers 31 and 41 are electrically conducted with the internal electrodes 71 and 72 exposed from the end surfaces 21B and 22B of the ceramic body 20B.

The method of forming the base layers 31 and 41 is the same as that in Example Embodiment 1, and thus the description thereof is omitted.

Formation of Resin Layers 32 and 42

The resin layers 32 and 42 including conductive powder are formed at the end of the ceramic body 20B. The method of forming the resin layers 32 and 42 is the same as that in Example Embodiment 1, and thus the description thereof is omitted.

Formation of Plating Films 33 and 43

The plating films (first plating films) 33 and 43 in direct contact with the resin layers 32 and 42 are formed. The method of forming the plating films 33 and 43 is the same as that in Example Embodiment 1, and thus the description thereof is omitted.

Formation of Second Plating Films 34 and 44

The second plating films 34 and 44 covering the plating films 33 and 43 may be formed. The method of forming the second plating films 34 and 44 is the same as that in Example Embodiment 1, and thus the description thereof is omitted.

As described above, the method for manufacturing the electronic component 10B according to Example Embodiment 2 of the present invention has been described by taking the positive characteristic thermistor including an internal electrode as an example. However, other electronic components including an internal electrode can also be appropriately manufactured based on the description of the present specification.

EXAMPLES

Hereinafter, example embodiments of the present invention will be specifically described with reference to examples. However, the present invention is not limited to the examples described below.

Example 1

Preparation of Object to be Plated

An "object to be plated" for forming a plating film was prepared.

A barium titanate-based semiconductor (hereinafter, referred to as an "element body") having a size of 0.53 mm (L)×0.27 (W)×0.27 (T) was prepared. A base layer for obtaining an ohmic junction with the element body was formed on a WT surface of the element body by sputtering. The base layer had a thickness of 2.5 μm. Next, a resin layer including an epoxy resin and a silver powder was formed on the WT surface so as to cover the base layer. In this way, the "object to be plated" including the element body, the base layer, and the resin layer was obtained.

Preparation of Plating Film and Second Plating Film

A nickel plating film was formed on the surface of the resin layer of the object to be plated by electrolytic barrel plating. As a plating bath, a Watt bath (pH 4.5, bath temperature 55° C., nickel sulfate 240 to 300 g/L, nickel chloride 45 to 50 g/L, boric acid 30 to 40 g/L) was used. Metal nickel was brought into contact with an anode electrode as a nickel source.

In the barrel plating, a metal medium (conductive medium) for assisting electrical conduction between objects to be plated and an insulating resin ball for stirring a barrel content were used.

First, the object to be plated and a conductive medium were put into a barrel container. The cathode electrode was disposed at a position in contact with the object to be plated and the conductive medium inside the barrel container. In addition, a resin ball for stirring was put into the barrel container. Thereafter, a current was controlled between an anode and a cathode at a predetermined current density for a predetermined time while the barrel was rotated, swung, or the like, thereby forming a nickel plating film having a desired thickness on the surface of the resin layer of the object to be plated. In Example 1, the average film thickness of the nickel plating film was 6.74 μm.

In addition, a tin plating film (second plating film) was formed on the surface of the nickel plating film by electrolytic barrel plating. As the plating bath, there are an acidic bath and an alkaline bath, and the acidic bath was selected. As the acidic bath, a sulfuric acid bath or a methanesulfonic acid bath was used. Metal tin as a tin source was brought into contact with the anode electrode. For the other plating conditions, the same operation as in the formation of the nickel plating film was performed. In Example 1, the average film thickness of the tin plating film was 4.37 μm.

After the formation of the tin plating film, the element body was washed with pure water and dried in a thermostatic chamber at 85° C. for 20 minutes and then at 120° C. for 6 hours to prepare a sample after plating (sample for measurement).

Evaluation of Orientation of Nickel Plating Film

In order to measure the orientation of the nickel plating film, the tin plating film of the measurement sample was dissolved in a solvent and removed. Although the solvent is not particularly limited as long as tin can be selectively dissolved, in Example 1, a solvent including boron fluoride as a main component was used. For the measurement sample from which the tin plating film had been removed, the exposed nickel plating film was subjected to micro X-ray diffraction measurement using D8 DISCOVER manufactured by BRUKER axs. A two-dimensional X-ray diffraction image obtained using a two-dimensional detector was converted into a one-dimensional profile. As the respective diffraction intensities I (111), I (200), and I (220) of the XRD diffraction peaks of the (111) plane, the (200) plane, and the (220) plane of the nickel plating film, a value of a diffraction intensity area of each peak of the obtained one-dimensional profile was used. The value of the diffraction intensity was obtained as a relative intensity with I (111) of the highest intensity as 100.

F, which was an index indicating the orientation of the (111) plane, was calculated using the following formulas (1) to (3). The value of F of the nickel plating film of Example 1 was 47.7% (0.477).

$$F=(P-P_0)/(1-P_0) \tag{1}$$

In the formula (1), $P_0$ and P were obtained by the following formulas (2) and (3).

$$P_0=I_0(111)/\{I_0(111)+I_0(200)+I_0(220)\} \tag{2}$$

$$P=I(111)/\{I(111)+I(200)+I(220)\} \tag{3}$$

In the formula (2), $I_0$ (111), $I_0$ (200), and $I_0$ (220) are the diffraction intensities of the (111) plane, the (200) plane, and the (220) plane obtained from the powder X-ray diffraction data of nickel obtained from the ICDD database, respectively.

In the formula (3), I (111), I (200), and I (220) are the diffraction intensities of the (111) plane, the (200) plane, and the (220) plane obtained from the XRD diffraction measurement of the nickel plating film of the measurement sample.

In addition, $F_{(200)}$ indicating the orientation of the (200) plane was obtained using the formulas (1-2), (2-2), and (3-2) and shown in Table 1.

$$F_{(200)}=(P_{(200)}-P_{0(200)})/(1-P_{0(200)}) \tag{1-2}$$

In the formula (1-2), $P_{0(200)}$ and $P_{(200)}$ were obtained by the following formulas (2-2) and (3-2).

$$P_{0(200)}=I_0(200)/\{I_0(111)+I_0(200)+I_0(220)\} \tag{2-2}$$

$$P_{(200)}=I(200)/\{I(111)+I(200)+I(220)\} \tag{3-2}$$

$I_0$ (111), $I_0$ (200), $I_0$ (220), I (111), I (200), and I (220) in the formulas (2-2) and (3-2) were similar to their definitions in the formulas (2) and (3).

In addition, $F_{(220)}$ indicating the orientation of the (220) plane was obtained using the formulas (1-3), (2-3), and (3-3) and shown in Table 1.

$$F_{(220)}=(P_{(220)}-P_{0(220)})/(1-P_{0(220)}) \tag{1-3}$$

In the formula (1-3), $P_{0(220)}$ and $P_{(220)}$ were obtained by the following formulas (2-3) and (3-3).

$$P_{0(220)}=I_0(220)/\{I_0(111)+I_0(200)+I_0(220)\} \tag{2-3}$$

$$P_{(220)}=I(220)/\{I(111)+I(200)+I(220)\} \tag{3-3}$$

$I_0$ (111), $I_0$ (200), $I_0$ (220), I (111), I (200), and I (220) in the formulas (2-3) and (3-3) were similar to their definitions in the formulas (2) and (3).

Evaluation of Fixability

Fixability between the nickel plating film and the resin layer was evaluated based on a breaking strength obtained by a transverse shear strength test method and a peeling mode at the time of breaking. A post-plating sample (sample for measurement) was mounted on a glass cloth base epoxy resin substrate (JIS C 6484: 2005) of a copper-clad laminate plate. First, a Sn-3Ag-0.5Cu solder paste was screen-printed on a substrate at a thickness of 200 μm. The measurement sample was placed on the solder paste on the substrate with the WT surface (surface on which the plating film was formed) facing the substrate, and was circulated in a reflow furnace in a nitrogen gas atmosphere at a maximum temperature of 220° C. in a room temperature atmosphere to be reflow-mounted.

As a method of measuring fixing strength, similarly to JIS 62137-1-2: 2010, the mounted measurement sample was pushed from the side by a push-pull gauge, and the strength when the measurement sample was peeled off from the substrate was measured.

After the measurement sample was peeled from the substrate, a solder portion of the substrate (e.g., a portion where the measurement sample was mounted) was observed using a digital microscope and a scanning electron microscope to determine whether the mode of peeling was due to ceramic breakage (peeling due to breakage of the element body) or electrode breakage (peeling due to breakage of an interface between the nickel plating film and the resin electrode, or peeling due to breakage of the nickel plating film itself).

Using ten measurement samples, measurement of the fixing strength and observation of the peeling mode were each performed 10 times. The average breaking strength was 7.95 N, and the number of broken ceramics and the number of broken electrodes in the peeling mode were 10 and 0, respectively.

Example 2

A sample after plating (measurement sample) was prepared similarly to Example 1 except that the plating conditions of the nickel plating film were changed and the value of F of the nickel plating film was 35.7% (0.357), and the fixing strength was evaluated. The average film thicknesses of the nickel plating film and the tin plating film were 5.32 μm and 3.16 μm, respectively.

The average breaking strength of the ten samples was 6.85 N, and the number of broken ceramics and the number of broken electrodes in the peeling mode were 10 and 0, respectively.

Example 3

A sample after plating (measurement sample) was prepared similarly to Example 1 except that the plating conditions of the nickel plating film were changed and the value of F of the nickel plating film was 25.8% (0.258), and the fixing strength was evaluated. The average film thicknesses of the nickel plating film and the tin plating film were 7.02 μm and 3.20 μm, respectively.

The average breaking strength of the ten samples was 7.43 N, and the number of broken ceramics and the number of broken electrodes in the peeling mode were 10 and 0, respectively.

Comparative Example 1

A sample after plating (measurement sample) was prepared similarly to Example 1 except that the plating conditions of the nickel plating film were changed and the value of F of the nickel plating film was 1.96% (0.0196), and the fixing strength was evaluated. The average film thicknesses of the nickel plating film and the tin plating film were 6.21 μm and 3.57 μm, respectively.

The average breaking strength of the ten samples was 4.53 N, and the number of broken ceramics and the number of broken electrodes in the peeling mode were 3 and 7, respectively.

Comparative Example 2

A sample after plating (measurement sample) was prepared similarly to Example 1 except that the plating conditions of the nickel plating film were changed and the value of F of the nickel plating film was 5.02% (0.0502), and the fixing strength was evaluated. The average film thicknesses of the nickel plating film and the tin plating film were 5.78 μm and 3.34 μm, respectively.

The average breaking strength of the ten samples was 3.97 N, and the number of broken ceramics and the number of broken electrodes in the peeling mode were 3 and 7, respectively.

Comparative Example 3

A sample after plating (measurement sample) was prepared similarly to Example 1 except that the plating conditions of the nickel plating film were changed and the value of F of the nickel plating film was −1.16% (−0.0116), and the fixing strength was evaluated. The average film thicknesses of the nickel plating film and the tin plating film were 5.19 μm and 3.37 μm, respectively.

The average breaking strength of the ten samples was 5.04 N, and the number of broken ceramics and the number of broken electrodes in the peeling mode were 2 and 8, respectively.

Comparative Example 4

A sample after plating (measurement sample) was prepared similarly to Example 1 except that the plating conditions of the nickel plating film were changed and the value of F of the nickel plating film was −10.9% (−0.109), and the fixing strength was evaluated. The average film thicknesses of the nickel plating film and the tin plating film were 5.54 μm and 3.22 μm, respectively.

The average breaking strength of the ten samples was 4.67 N, and the number of broken ceramics and the number of broken electrodes in the peeling mode were 3 and 7, respectively.

The results of Examples 1 to 3 and Comparative Examples 1 to 4 are summarized in Table 1. The post-plating sample (measurement sample) in which the value of F indicating the orientation of (111) of the nickel plating film was 20.0% or more and 50.0% or less (0.20 or more and 0.50 or less) had high breaking strength after solder mounting, and in the evaluation of the peeling mode, there was no sample in which the electrode was broken (the interface between the nickel plating film and the resin electrode was broken and peeled off, or the nickel plating film itself was broken and peeled off). That is, it was confirmed that by improving the orientation of (111) of the nickel plating film so that the value of F was about 0.20 or more and about 0.50 or less, peeling of the nickel plating film was reduced or prevented, and the fixing strength between the nickel plating film and the resin layer was improved.

TABLE 1

| Example/ | Orientation | | | Evaluation of fixability | | |
|---|---|---|---|---|---|---|
| Comparative Example | F (111) plane | $F_{(200)}$ (200) plane | $F_{(220)}$ (220) plane | Average breaking strength of 10 samples (N) | Number of broken ceramics (ceramics) | Number of broken electrodes (electrodes) |
| Example 1 | 47.7% | −15.3% | −2.18% | 7.95 | 10 | 0 |
| Example 2 | 35.7% | −12.6% | −4.87% | 6.85 | 10 | 0 |
| Example 3 | 25.8% | −12.4% | −5.29% | 7.43 | 10 | 0 |
| Comparative Example 1 | 1.96% | 3.38% | −3.69% | 4.53 | 3 | 7 |
| Comparative Example 2 | 5.02% | 3.13% | −4.87% | 3.97 | 3 | 7 |
| Comparative Example 3 | −1.16% | 3.43% | −2.41% | 5.04 | 2 | 8 |
| Comparative Example 4 | −10.9% | −8.70% | −2.58% | 4.67 | 3 | 7 |

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:

a ceramic body; and an external electrode at an end of the ceramic body; wherein the external electrode includes a resin layer including a conductive powder and a plating film in direct contact with the resin layer, the plating film includes a metal with a face-centered cubic structure, and F is about 0.20 or more and about 0.50 or less, where:

$$F=(P-P_0)/(1-P_0);$$

$$P_0=I_0(111)/\{I_0(111)+I_0(200)+I_0(220)\}:$$

$$P=I(111)/\{I(111)+I(200)+I(220)\};\text{ and}$$

$I_0$ (111), $I_0$ (200), and $I_0$ (220) are diffraction intensities of a (111) plane, a (200) plane, and a (220) plane obtained from known powder X-ray diffraction data for a metal of the plating film, respectively, and I (111), I (200), and I (220) are diffraction intensities of a (111) plane, a (200) plane, and a (220) plane obtained from an X-ray diffraction pattern of the plating film, respectively.

2. The electronic component according to claim 1, wherein the metal with the face-centered cubic structure is at least one selected from the group consisting of Ni, Au, Cu, Ag, Pt, Pd, and Al.

3. The electronic component according to claim 1, wherein the conductive powder is a metal powder.

4. The electronic component according to claim 3, wherein the metal powder is one of Ag, Au, Ni, Cu, Pt, Pd or Al.

5. The electronic component according to claim 1, wherein the resin layer includes a thermosetting resin.

6. The electronic component according to claim 1, wherein the external electrode further includes a second plating film covering the plating film.

7. The electronic component according to claim 6, wherein the second plating film includes Sn, Au, Cu or Pd.

8. The electronic component according to claim 6, wherein a thickness of the second plating film is about 0.5 μm or more and about 5.0 μm or less.

9. The electronic component according to claim 1, wherein the electronic component has a length of about 0.6 mm or more and about 1.0 mm or less and a width of about 0.3 mm or more and about 0.5 mm or less.

10. The electronic component according to claim 1, wherein the electronic component is a positive temperature coefficient thermistor.

11. The electronic component according to claim 1, wherein the external electrode further includes a base layer between a surface of the end of the ceramic body and the resin layer.

12. The electronic component according to claim 1, wherein F is about 0.23 or more and about 0.48 or less.

13. The electronic component according to claim 1, wherein F is about 0.25 or more and about 0.45 or less.

14. The electronic component according to claim 1, wherein a thickness of the plating film is about 2 μm or more and about 10 μm or less.

15. The electronic component according to claim 1, wherein the resin includes a curing agent.

16. The electronic component according to claim 1, wherein the electronic component is a ceramic electronic component chip.

17. The electronic component according to claim 1, wherein the electronic component is a negative temperature coefficient thermistor.

18. The electronic component according to claim 1, wherein the electronic component is a varistor.

19. The electronic component according to claim 1, wherein the electronic component is a capacitor.

20. The electronic component according to claim 1, wherein the ceramic body includes $BaTiO_3$, $CaTiO_3$, $SrTiO_3$, $CaZrO_3$, $(BaSr)TiO_3$, $Ba(ZrTi)O_3$, or $(BiZn)Nb_2O_7$.

* * * * *